(12) United States Patent
Shibamiya

(10) Patent No.: US 7,610,609 B2
(45) Date of Patent: Oct. 27, 2009

(54) NETWORK SYSTEM AND ELECTRONIC DEVICE

(75) Inventor: Yoshikazu Shibamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 10/845,176

(22) Filed: May 14, 2004

(65) Prior Publication Data

US 2004/0240475 A1 Dec. 2, 2004

(30) Foreign Application Priority Data

May 28, 2003 (JP) .............................. 2003-151174
Apr. 27, 2004 (JP) .............................. 2004-131410

(51) Int. Cl.
H04N 7/16 (2006.01)
(52) U.S. Cl. .......................... 725/153; 725/80; 725/133
(58) Field of Classification Search .................. 725/80, 725/151, 153
See application file for complete search history.

(56) References Cited

U.S. PATENT DOCUMENTS

| | | | | |
|---|---|---|---|---|
| 4,633,309 A | * | 12/1986 | Li et al. ...................... | 725/152 |
| 4,695,880 A | * | 9/1987 | Johnson et al. ............. | 725/151 |
| 6,038,425 A | * | 3/2000 | Jeffrey ........................ | 725/80 |
| 6,188,397 B1 | * | 2/2001 | Humpleman ................ | 725/80 |
| 6,263,497 B1 | * | 7/2001 | Maeda et al. ............... | 717/170 |
| 6,282,713 B1 | * | 8/2001 | Kitsukawa et al. ........... | 725/36 |
| 6,314,326 B1 | | 11/2001 | Fuchu ......................... | 700/17 |
| 6,588,017 B1 | * | 7/2003 | Calderone ................... | 725/80 |
| 6,870,571 B1 | * | 3/2005 | Narushima et al. ............ | 725/80 |
| 7,337,456 B1 | * | 2/2008 | Nihei ......................... | 725/35 |
| 2002/0144295 A1 | * | 10/2002 | Hirata ........................ | 725/153 |
| 2004/0061805 A1 | | 4/2004 | Shibamiya et al. .......... | 348/565 |
| 2005/0158100 A1 | * | 7/2005 | Yamaguchi et al. .......... | 400/62 |

FOREIGN PATENT DOCUMENTS

| | | |
|---|---|---|
| EP | 0783229 A1 | 9/1997 |
| EP | 0895157 A1 | 3/1999 |
| JP | 10-229409 | 8/1998 |
| JP | 11-102287 | 4/1999 |
| JP | 2003-046986 | 2/2003 |
| KR | 1999-84417 | 6/1999 |
| KR | 2003-10342 | 2/2003 |
| TW | 304251 | 4/1985 |
| WO | WO 03083639 A1 * | 10/2003 |

OTHER PUBLICATIONS

U.S. Appl. No. 09/579,532, filed May 26, 2000.

* cited by examiner

Primary Examiner—Scott Beliveau
Assistant Examiner—Jeremy Duffield
(74) Attorney, Agent, or Firm—Fitzpatrick, Cella, Harper & Scinto

(57) ABSTRACT

A network system has a plurality of electronic devices connected to a network. At least one of the electronic devices receives a broadcast signal including data relating to an electronic device. The network system has a processing circuit that collates data contained in the broadcast signal with inherent information of an electronic device connected to the network, and generates a signal for causing at least one of the electronic devices to execute predetermined processing according to a result of the collation.

4 Claims, 16 Drawing Sheets

STRUCTURE OF DATA PORTION

FIG. 9

ACTION_INFO

| VALUE | MEANS |
|---|---|
| xxxxxxx1 | DATA REWRITING |
| xxxxxx1x | DISPLAY |
| xxxxx1xx | PRINT |
| xxxx1xxx | TRANSFER |
| 1xxxxxxx | EXPANSION |
| OTHER VALUES | RESERVED |

FIG. 10

DATA_INFO

| VALUE | MEANS |
|---|---|
| 01h | PROGRAM |
| 02h | GRAPHIC |
| 03h | PRINT |
| 04h | AUDIO |
| FFh | EXPANSION |
| OTHER VALUES | RESERVED |

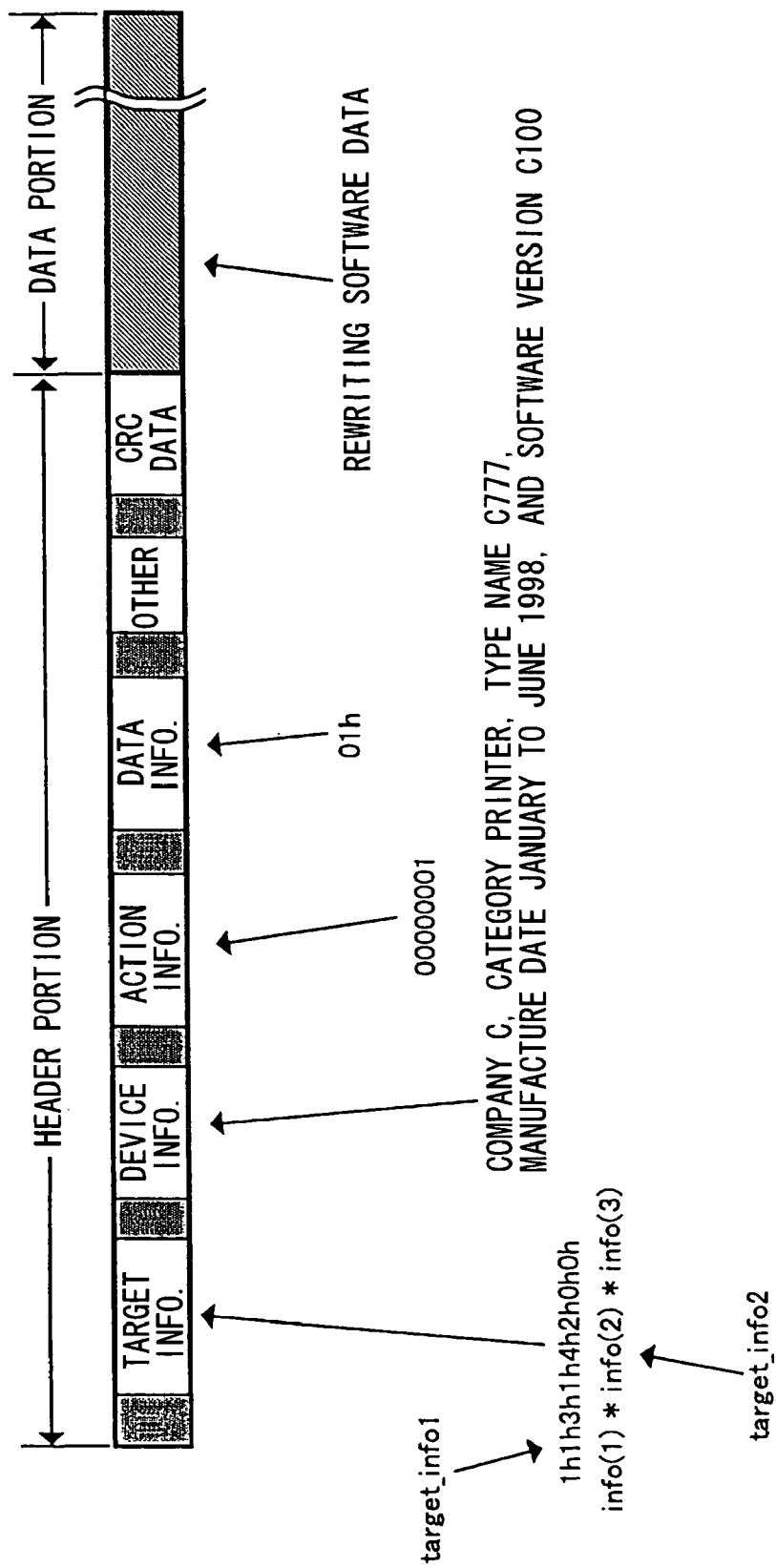

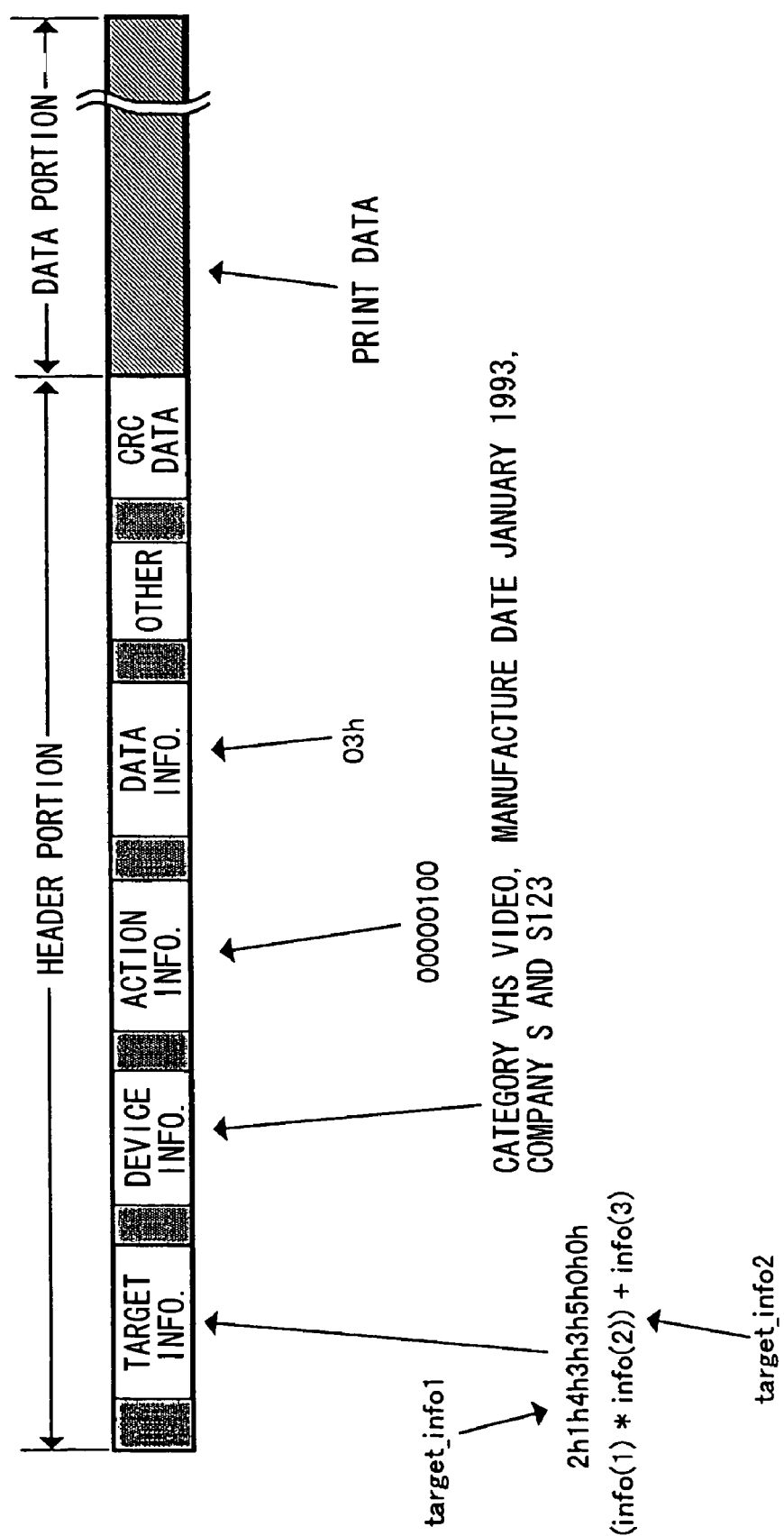

NETWORK SYSTEM AND ELECTRONIC DEVICE

BACKGROUND OF THE INVENTION

1. Field of the Invention

The present invention relates to a technique for controlling an electronic device by using a broadcast signal.

2. Description of the Related Art

Nowadays, digital broadcast is drawing the attention. In Europe, commercial broadcast according to DVB standards has already been started. In Japan as well, digital broadcast using a satellite is present.

As techniques using the digital broadcast, the following techniques are known.

Japanese Patent Application Laid-Open (JP-A) No. 2003-46986 discloses a receiver apparatus which gives commercial message (hereafter abbreviated to CM) points to a viewer when the viewer has viewed a CM, which gives service to the viewer according to accumulated CM points, and which issues a discount coupon.

JP-A No. 11-102287 discloses a remote maintenance method for updating software by using digital broadcast. In this method, program information is transmitted by digital broadcast. The program information includes a machine kind code indicating a version of hardware capable of receiving program data, version information indicating a version of software corresponding to the machine kind code, a program name which is a name of a program replaced or added depending upon the software version, and a program code of a program. Upon receiving the digital broadcast, hardware determines whether version up has already been performed, by comparing its own machine kind code and version information with the machine kind code and the version information contained in the program information. If version up has not been performed, the hardware stores the program code, and performs the version up.

JP-A No. 10-229409 discloses a configuration for automatically transferring user interface information stored in an AV device to a personal computer when the AV device has been started in a home network connecting AV devices such as a TV receiver to the personal computer.

SUMMARY OF THE INVENTION

Heretofore, a configuration for effectively using data contained in a broadcast signal in a network having a plurality of electronic devices connected thereto has not been known.

An object of the present invention is to provide a technique for making an electronic device execute predetermined processing by effectively using a broadcast signal.

According to a first aspect of the invention, a network system comprising: a plurality of electronic devices connected to a network, at least one of the electronic devices being capable of receiving a broadcast signal, the broadcast signal including data relating to an electronic device; and a processing circuit that collates data contained in the broadcast signal with inherent information of an electronic device connected to the network, and generates a signal for causing at least one of the electronic devices to execute predetermined processing according to a result of the collation.

According to a second aspect of the invention, an electronic device which can be connected to a network connected to other electronic device, the electronic device comprising: a receiver that receives a broadcast signal, the broadcast signal including data relating to an electronic device; and a processing circuit that collates data contained in the broadcast signal with inherent information of an electronic device connected to the network, and generates a signal for causing at least one of the electronic devices to execute predetermined processing according to a result of the collation.

According to a third aspect of the invention, there is provided a program for causing an electronic device which can be connected to a network connected to other electronic device and which can receive a broadcast signal to execute the steps of: receiving a broadcast signal, the broadcast signal including data relating to an electronic device; collating data contained in the broadcast signal with inherent information of an electronic device connected to the network; and generating a signal for causing at least one of the electronic devices to execute predetermined processing according to a result of the collation.

According to a fourth aspect of the invention, there is provided a broadcast method for transmitting a broadcast signal, wherein the broadcast signal includes data relating to a different electronic device other than an electronic device receiving the broadcast signal, and the data comprises first information to be collated with inherent information of the different electronic device, and second information representing predetermined processing to be executed according to a result of the collation of the first information with the inherent information.

In the present invention, preferably, the processing circuit is disposed in a chassis of the electronic device which is capable of receiving the broadcast signal.

Preferably, each of the electronic devices has a separate chassis.

Preferably, the predetermined processing is specified by the data contained in the broadcast signal.

Preferably, the processing circuit generates a signal for causing the electronic device which is collated in inherent information to execute the predetermined processing.

Preferably, the processing circuit generates a signal for causing an electronic device different from the electronic device which is collated in inherent information to execute the predetermined processing.

Preferably, the predetermined processing is version up processing for software held in the electronic device.

Preferably, the predetermined processing is print processing.

Preferably, the predetermined processing is display processing.

BRIEF DESCRIPTION OF THE DRAWINGS

FIG. 9 is a diagram showing action information;

FIG. 10 is a diagram showing data information;

FIG. 12 is a diagram showing a data structure of additional data in the first processing operation example;

FIG. 14 is a diagram showing a data structure of additional data in the second processing operation example.

DESCRIPTION OF THE PREFERRED EMBODIMENTS

Hereafter, embodiments of a network system, an electronic device, a program and a broadcast method according to the present invention will now be described with reference to the drawings.

Figure 1:
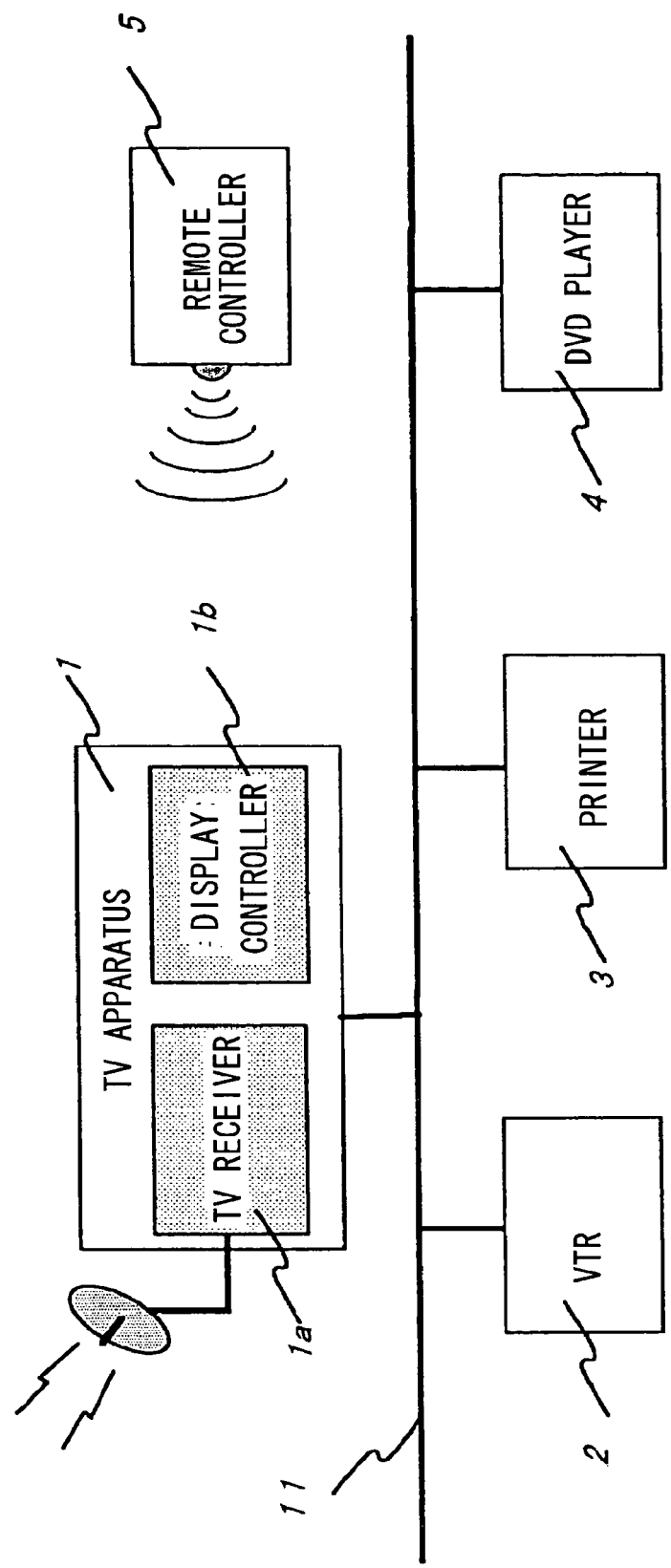
FIG. 1 is a block diagram showing a configuration of a network system according to an embodiment.

FIG. 1 is a block diagram showing a general configuration of a network system (home bus system) according to an embodiment. The network system includes a plurality of electronic devices connected to a network 11, i.e., a TV apparatus 1, a VTR 2, a printer 3 and a DVD player 4 in FIG. 1.

The TV apparatus 1 is an electronic device capable of receiving a digital broadcast signal (hereafter also referred to as "digital TV broadcast."). The TV apparatus 1 includes a TV receiver 1a and a display controller 1b. The TV apparatus 1 performs reception of digital TV broadcast, transmission/reception of a signal to/from a remote controller 5, transmission/reception of data to/from another electronic device connected to the network 11, control of those electronic devices and so on. The TV apparatus 1 displays TV image data, device image data, various icon data, control information and so on which are obtained through the processing.

The VTR 2 is an electronic device for recording and reproducing image data such as a TV image, and audio data. Furthermore, the VTR 2 can record and read device information data for VTR operation. These data are input and output through the TV receiver 1a and the network 11.

The printer 3 is an electronic device for printing various data input through the network 11. For example, capture images on the TV screen, electronic program guide (EPG) data, and Cm broadcast additional data described later are input from the TV apparatus 1 to the printer 3.

The DVD player 4 is an electronic device for reproducing image and voice on a DVD medium and outputting the reproduced signal to the TV apparatus 1 through the network 11.

The viewer (user) can control the TV apparatus 1, the VTR 2, and so on by using the remote controller 5.

The TV apparatus 1, the VTR 2, the printer 3 and the DVD player 4 are connected to the network 11. The network 11 makes possible data transmission and reception. In the present embodiment, a network based on the IEEE 1394 standards is used.

"IEEE 1394 high speed serial bus (hereafter referred to as IEEE 1394 I/F), " which is the network used in the present embodiment, will now be described. The IEEE 1394 I/F is a network bus that corresponds to the daisy chain scheme, the node branch scheme, and a combination of them, and that makes possible connection having a high degree of freedom.

The IEEE 1394 I/F is a data transfer scheme for performing serial transfer at a bit rate of 100 MHz, 200 MHz, or 400 MHz. Since a device having a faster transfer rate supports a slower transfer rate, devices having different transfer rates can be mixedly present.

In the IEEE 1394 I/F, it is possible to connect or disconnect (the so-called hot plug) a device while the power is on. Furthermore, by connecting a device or turning on/off the power, the whole bus is reset and reconstruction and re-recognition of the connection configuration are performed, and thus IDs can be assigned to networked devices.

In the IEEE 1394 I/F, all devices can recognize bus information such as the connection configuration.

In the transfer mode of the IEEE 1394 I/F, there are asynchronous transfer in which packet data is transferred only once, and isochronous transfer in which continuous data are transferred at fixed intervals (125 μs). The asynchronous transfer is effective for transfer of data that are transferred asynchronously as occasion demands, such as a control signal and file data. The isochronous transfer is effective for transfer of data required to be continuous in time, such as video data or audio signal (so-called stream data). In the isochronous transfer, therefore, the transfer band is ensured.

In the IEEE 1394 I/F, all data transfer is performed by taking 32 bits as the unit (quadlet). In the case of data less than 32 bits, therefore, a transfer packet having a 32-bit configuration is produced by adding "0"s.

Figure 2:
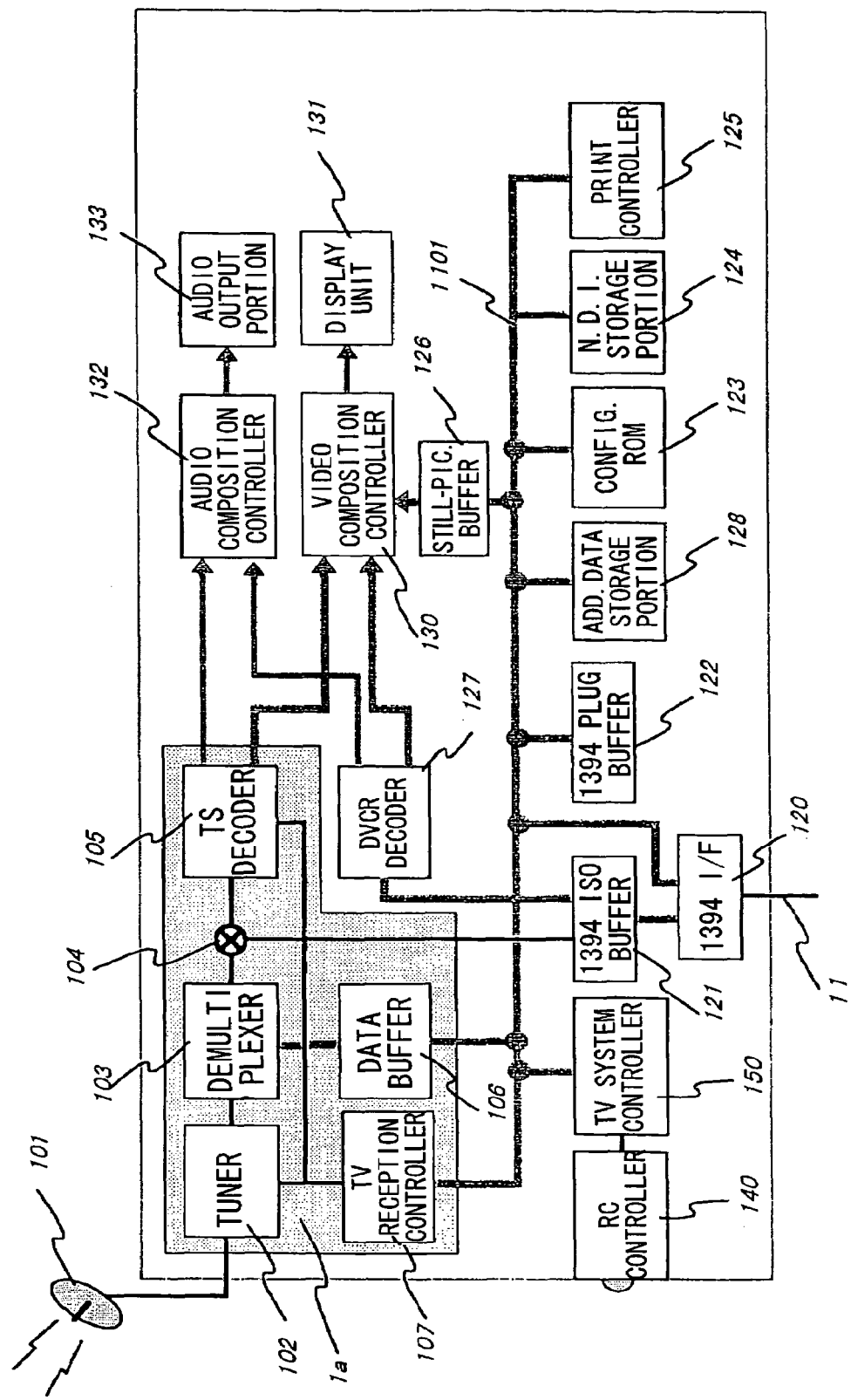
FIG. 2 is a block diagram showing a configuration of a TV apparatus 1.

FIG. 2 is a block diagram showing a configuration of the TV apparatus 1 in further detail. In the present embodiment, the TV apparatus 1 corresponds to an electronic device in the present invention.

The TV receiver 1a in the TV apparatus 1 includes an antenna 101, a tuner 102, a demultiplexer 103, a switch 104, a TS decoder 105, a data buffer 106 and a TV reception controller 107. The display controller 1b includes a 1394 I/F 120, a 1394 isochronous buffer 121, a 1394 asynchronous plug buffer (hereafter also referred to as 1394 plug buffer) 122, a configuration ROM 123, a networked-device-information storage portion 124, a print controller 125, a still-picture buffer 126, a DVCR decoder 127, an additional data storage portion 128, a video composition controller 130, a display unit 131, an audio composition controller 132, an audio output portion 133, an RC controller 140, and a TV system controller 150. These components are connected by an inner bus 1101.

The antenna 101 receives a radio wave of digital TV broadcast from the outside, converts it to a high frequency electric signal, and leads the high frequency electric signal to the tuner 102.

The tuner 102 has a function of amplifying the high frequency TV signal supplied from the antenna 101, selecting a desired broadcast station, demodulating a high frequency TV signal modulated by a carrier wave, and converting the high frequency TV signal to digital stream data (heretofore referred to as TS (Transport Stream) data).

The demultiplexer 103 selects desired program TS data from the TS signal obtained from the tuner 102, and separates accounting information (hereafter referred to as CA) data, electronic program guide (hereafter referred to as EPG) data, and CM broadcast additional data described later. The program TS data is transferred to the TS decoder 105 through the switch 104, and other data are transferred to the data buffer 106.

The switch 104 selects either the program TS data supplied from the demultiplexer 103 or the program TS data supplied from the network 11 as an input to the TS decoder 105. The switch 104 has also a function of outputting the program TS data to the 1394 I/F 120.

The TS decoder 105 decodes the program TS data input from the switch 104, reproduces digital moving image data and PCM audio data, and outputs the digital moving image data and PCM audio data to the video composition controller 130 and the audio composition controller 132.

The data buffer 106 stores data separated from the program TS data, such as the CA data, the EPG data and the CM broadcast additional data.

The TV reception controller 107 controls components ranging from the antenna 101 to the TS decoder 105, and conducts the channel switching, the accounting control and control concerning the EPG data. At this time, the TV reception controller 107 conducts transmission and reception of necessary data such as remote control data described later with the TV system controller 150.

The 1394 I/F 120 conducts control and management of the fast serial I/F according to standards in IEEE 1394. The 1394 I/F 120 conducts data transmission and reception between the network 11, and the 1394 isochronous buffer 121 and the 1394 plug buffer 122.

The 1394 isochronous buffer 121 temporarily stores the isochronous data received by the 1394 I/F 120, and supplies the isochronous data to the TS decoder 105 through the switch 104. Furthermore, the 1394 isochronous buffer 121 temporarily stores the program TS data received through the demultiplexer 103 and the switch 104, and supplies the program TS data to the 1394 I/F 120.

The 1394 plug buffer 122 includes a plug register and a segment buffer required at the time of AV/C asynchronous transfer. The 1394 plug buffer 122 is used as a temporary storage place for data concerning flow control and asynchronous data at the time of asynchronous transfer. The CM broadcast additional data and various control information data transferred from the data buffer 106 are re-transferred to a necessary place via the 1394 plug buffer 122.

The configuration ROM 123 is a read only memory in which inherent information of a device, such as a maker name, a device name, a manufacture number, and software version information in the controller of the TV apparatus 1, is stored. These kinds of information can be read out from another device through the 1394 I/F 120 and the network 11.

Two kinds of networked-device-information, i.e., inherent information of each device, such as a maker name, a device name, a manufacture number, and software version information in the controller of each of devices connected to the network 11, and usability information indicating whether these devices are in the power-on state and usable are stored in the networked-device-information storage portion 124.

The print controller 125 controls the printer 3 connected to the network 11 according to an order issued by the TV system controller 150, and prints data supplied from the data buffer 106, the still-picture buffer 126 or the like.

The still-picture buffer 126 is a buffer memory for receiving, through the inner bus 1101, the digital TV broadcast additional data, such as the CM broadcast additional data and the EPG data stored in the data buffer 106, the control information generated in the TV apparatus 1, and various kinds of still-picture information input through the 1394 I/F 120, and temporarily storing those data in order to supply them to the video composition controller 130.

The DVCR decoder 127 decodes data received from a digital video coder (hereafter referred to as DVCR) via the network 11, the 1394 I/F 120 and the 1394 isochronous buffer 121, reproduces the digital moving image data and PCM audio data, and outputs those data to the video composition controller 130 and the audio composition controller 132.

The additional data storage portion 128 is a preservation memory for preserving data that are included in the TV-received additional data stored in the data buffer 106 and that cannot be executed because, for example, the device cannot be used. This is a flash ROM, and stored contents do not disappear even if the power supply for the TV apparatus 1 is switched off.

The video composition controller 130 switches or combines moving picture data supplied from the TS decoder 105 and/or the DVCR decoder 127, and still-picture data supplied from the still-picture buffer 126 under the control of the TV system controller 150, and outputs resultant data to the display unit 131 as digital RGB image data, the horizontal synchronizing signal and the vertical synchronizing signal.

The display unit 131 displays an image on the basis of the digital RGB image data, the horizontal synchronizing signal and the vertical synchronizing signal input from the video composition controller 130. The display unit 131 is a high resolution dot matrix display capable of displaying an image with a vertical resolution of 1080 lines and a horizontal resolution of 1920 lines.

The audio composition controller 132 switches or combines PCM audio data supplied from the TS decoder 105 and PCM audio data supplied from the DVCR decoder 127, controls the sound volume, the sound quality and the presence, and outputs resultant data to the audio output portion 133.

The audio output portion 133 conducts D/A conversion on PCM audio data input from the audio composition controller 132, amplifies a resultant analog signal, and outputs the amplified analog signal from a speaker.

The RC controller 140 receives remote control data transmitted from the remote controller 5 according to operation of the TV viewer, and transfers the remote control data to the TV system controller 150.

The TV system controller 150 exercises general control on the components in the TV apparatus 1 connected to the inner bus 1101. The TV system controller 150 conducts analysis of remote control data, control of various components according to remote control data, transfer of remote control data to the TV reception controller 107, information transmission and reception, analysis of the CM broadcast additional data in the data buffer 106, transmission of data through the network 11 according to a result of analysis and networked-device information, printing processing, writing into the still-picture buffer 126, control of the still-picture buffer 126 and the video composition controller 130, and display control of images of the TV receiver 1a and the VTR and various kinds of information display. The TV system controller 150 controls the audio composition controller 132, and conducts various kinds of control on the audio signal. Furthermore, the TV system controller 150 conducts control of the 1394 I/F 120, management of the 1394 isochronous buffer 121, and management of the 1394 plug buffer 122. Thereby, the TV system controller 150 conducts data transmission and reception with the VTR 2 and the printer 3 connected to the network 11, through the network 11, and controls the VTR 2.

The inner bus 1101 includes a data bus and a control bus. As described above, the inner bus 1101 is a bus in the TV apparatus 1 used for transfer of image data and audio data and transfer of information of various components.

Figure 3:
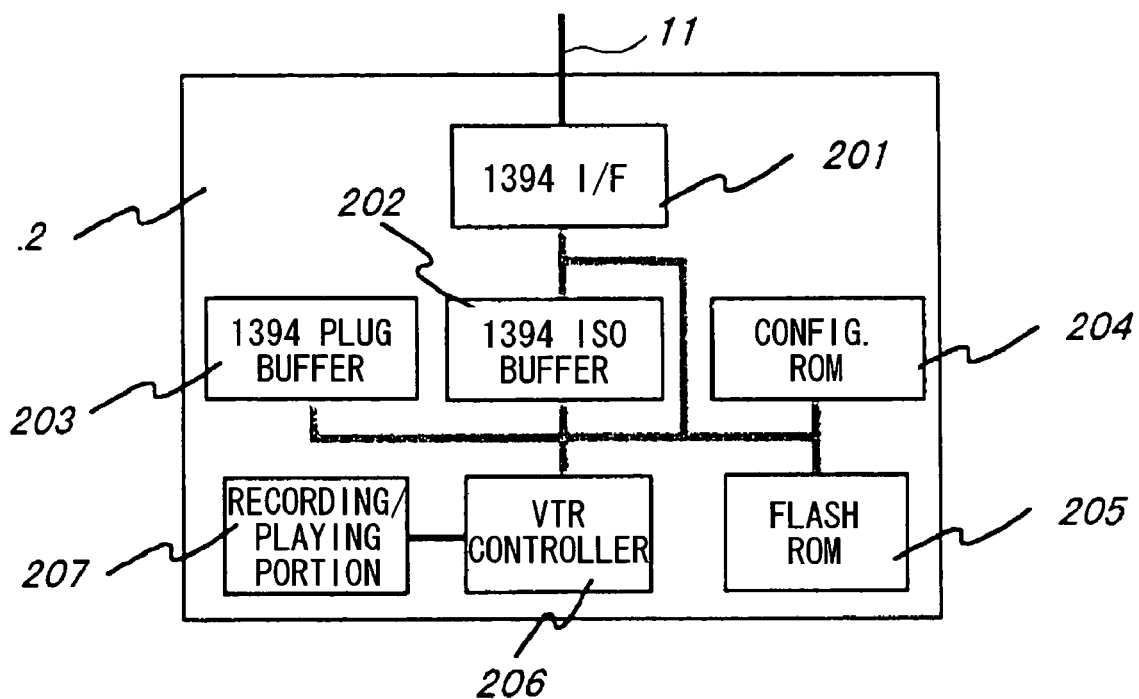
FIG. 3 is a block diagram showing a configuration of a VTR 2.

FIG. 3 is a block diagram showing a configuration of the VTR 2 in more detail. The VTR 2 includes a 1394 I/F 201, a 1394 isochronous buffer 202, a 1394 asynchronous plug buffer (hereafter also referred to as plug buffer) 203, a configuration ROM 204, a flash ROM 205, a VTR controller 206, and a recording/playing portion 207.

The 1394 I/F 201 is similar to the above-described 1394 I/F 120. The 1394 I/F 201 conducts control and management between the network 11 and the inside of the VTR 2.

The 1394 isochronous buffer 202 is similar to the above-described 1394 isochronous buffer 121. The 1394 isochronous buffer 202 is a temporary storage place for digital video image data supplied from the network 11 or the recording/playing portion 207.

The 1394 plug buffer 203 is similar to the above-described 1394 plug buffer 122, and is used as a temporary storage place for asynchronous data.

The configuration ROM 204 is similar to the above-described configuration ROM 123. Inherent information of devices, such as the maker name, device name, manufacture date and function of the VTR 2, is stored in the configuration ROM 204.

The flash ROM 205 is a nonvolatile rewritable memory. The VTR controller 206 can rewrite the flash ROM 205 through an inner bus, and other devices can also rewrite the flash ROM 205 through the network 11. A program to be executed in the VTR controller 206 and converted icon data are stored in the flash ROM 205.

The VTR controller 206 controls the recording/playing portion 207 on the basis of VTR control information received through the network 11, the 1394 I/F 201 and the 1394 plug buffer 203. Furthermore, the VTR controller 206 transmits display data such as icons according to the control situation of the recording/playing portion 207 to the TV apparatus 1 through the flash ROM 205, the 1394 plug buffer 203, the 1394 I/F 201 and the network 11.

The recording/playing portion 207 includes a videotape travel system mechanism portion, a controller of the mechanism, and a video signal modulation and demodulation portion. The recording/playing portion 207 is controlled by the VTR controller 206.

Figure 4:
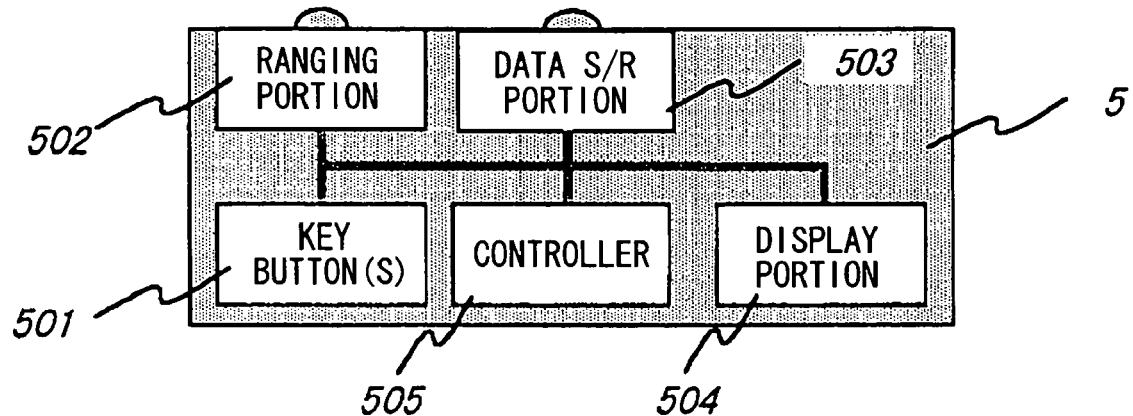
FIG. 4 is a block diagram showing a configuration of a remote controller 5.

FIG. 4 is a block diagram showing a configuration of the remote controller 5 in more detail. The remote controller 5 includes a key button(s) 501, a ranging portion 502, a data sending/receiving portion 503, a display portion 504 and a controller 505.

The user can order execution of desired operation by pressing the key button 501.

The ranging portion 502 is a ranging portion of so-called reflection type used in cameras or the like. The ranging portion 502 emits infrared light to a ranging subject and measures the distance by using the reflection. When the key button 501 is pressed, the ranging portion 502 measures the distance between the TV apparatus 1 and the remote controller 5.

The data sending/receiving portion 503 transmits a key code and distance data to the RC controller 140 in the TV apparatus 1. The data sending/receiving portion 503 receives a response or the like from the TV apparatus 1.

The display portion 504 conducts error display when key button operation is not received by the TV apparatus 1.

The controller 505 controls detection of the pressed key button 501, encoding of the key code based on the detected key button 501, transmission of the key code to the TV apparatus 1, and reception of the response or the like. The controller 505 controls the distance measurement conducted by the ranging portion 502 and transmission of the obtained distance data.

Figure 5:
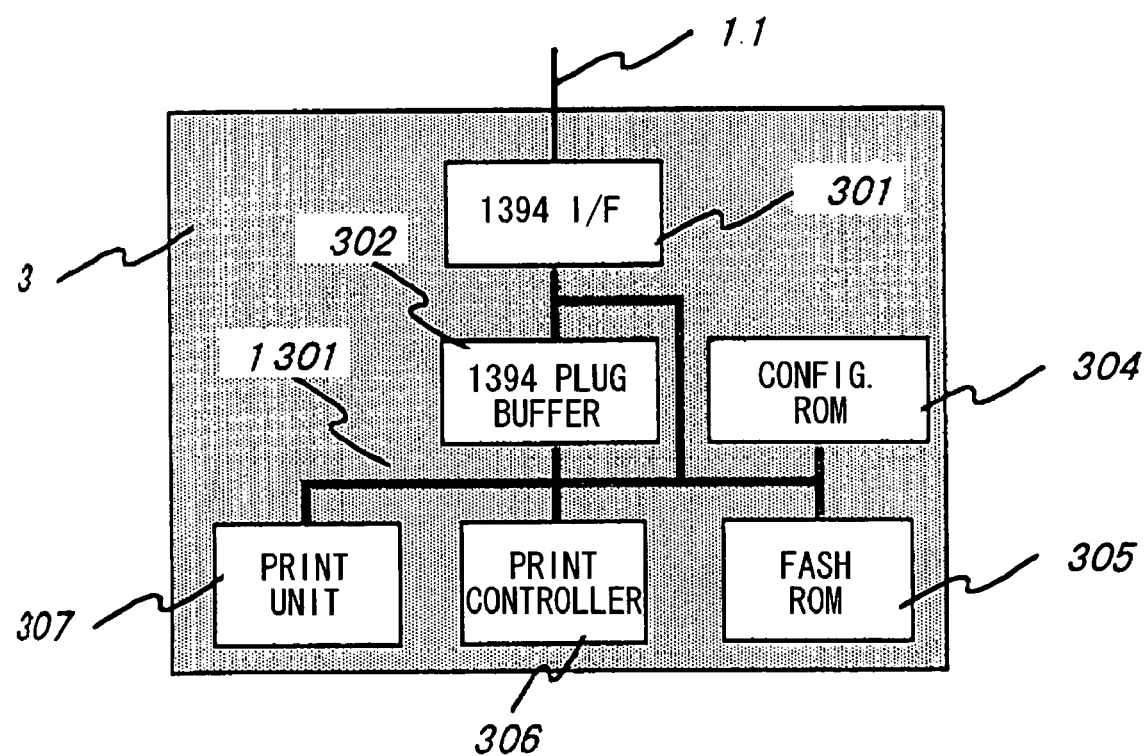
FIG. 5 is a block diagram showing a configuration of a printer 3.

FIG. 5 is a block diagram showing a configuration of the printer 3 in more detail. The printer 3 includes a 1394 I/F 301, a 1394 asynchronous plug buffer (hereafter also referred to as plug buffer) 302, a configuration ROM 304, a flash ROM 305, a print controller 306 and a print unit 307. These components are connected by an inner bus 1301.

The 1394 I/F 301 is similar to the above-described 1394 I/F 120. The 1394 I/F 301 controls and manages data transmission and reception in the network 11 and the printer 3.

The 1394 asynchronous plug buffer 302 is similar to the above-described 1394 asynchronous plug buffer 122. The 1394 asynchronous plug buffer 302 is used as a temporary storage place for asynchronous data such as printing data.

The configuration ROM 304 is similar to the above-described configuration ROM 123. Inherent information of devices, such as the maker name, device name, manufacture date and software version of the printer 3, is stored in the configuration ROM 304.

The flash ROM 305 is a nonvolatile rewritable memory. The print controller 306 can rewrite the flash ROM 305 through the inner bus 1301, and other devices can also rewrite the flash ROM 305 through the network 11. A program to be executed in the print controller 306, a control command, font data, and so on are stored in the flash ROM 305.

The print controller 306 controls the print unit 307 on the basis of printer control information and print data received through the network 11, the 1394 I/F 301 and the 1394 plug buffer 302, and causes printing to be executed.

Although not concretely illustrated, the print unit 307 includes a print mechanism, a print head, and a controller of the print mechanism and the print head. The print unit 307 is controlled by the print controller 306 to execute printing.

Figure 6:
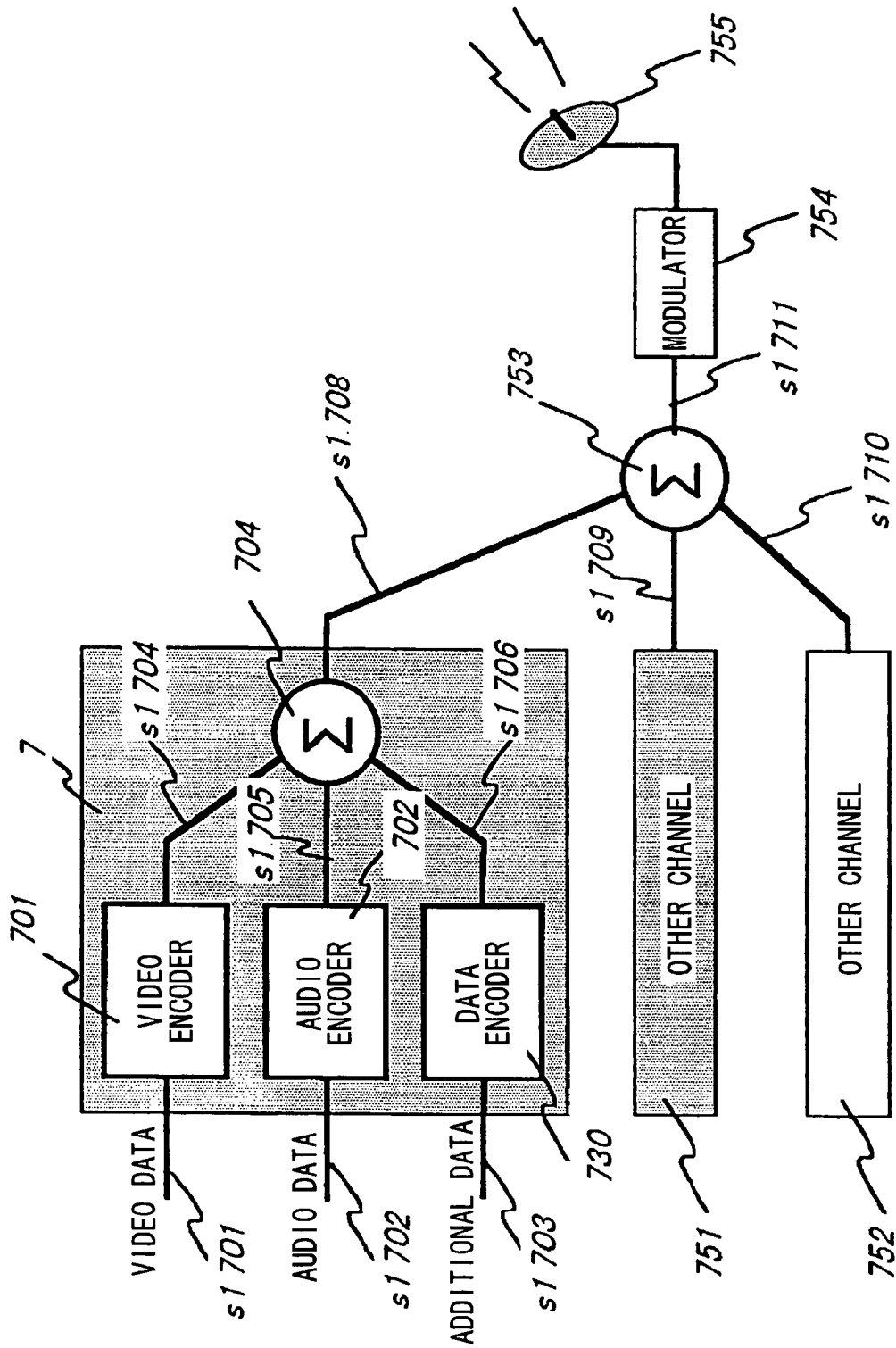
FIG. 6 is a block diagram showing a configuration of a generation apparatus for generating a TS signal to be sent as a broadcast signal.

The TS signal of digital TV broadcast will now be described. FIG. 6 shows a generation apparatus for generating the TS signal sent out as a broadcast electric wave.

Video data s1701, audio data s1702 and additional data s1703 are input to a signal generating unit 7 of a certain channel.

These data are encoded by a video encoder 701, an audio encoder 702 and a data encoder 730, respectively. A header is added to each of the encoded data to form a packet. Video PES (Packetized Elementary Stream) signals s1704, audio PES signals s1705 and data PES signals s1706 are thus formed.

Thereafter, a TS packet generator 704 puts together (multiplexes) the video, audio and additional data PES signals s1704 to s1706 to generate a TS signal s1708 (TS1) for one channel.

In other channels 751 and 752 as well, video, audio and additional data are put together (multiplexed) to generate TS signals s1709 (TS2) and s1710 (TS3), respectively, in the same way. The number of channels may be one or more.

The three TS signals s1708, s1709 and s1710 are put together (multiplexed) again by a TS multiplexing apparatus 753 to generate a TS signal (TS4) s1711.

At the time of packetizing and multiplexing, a header including a PID (Program ID), a PMT (Program Map Table), a table_ID and a tag_value as identifiers at the time of reproduction is added to the TS signal.

As regards the above-described encode method, packetizing method and multiplexing method, those prescribed in IEC 13818-1, IEC 13818-2 and IEC 13818-3 are typical. Details of them will be omitted.

The TS signal s1711 (TS4) obtained by narrowing down to one signal is modulated by a modulator 754, and sent out from an antenna 755.

Figure 7:
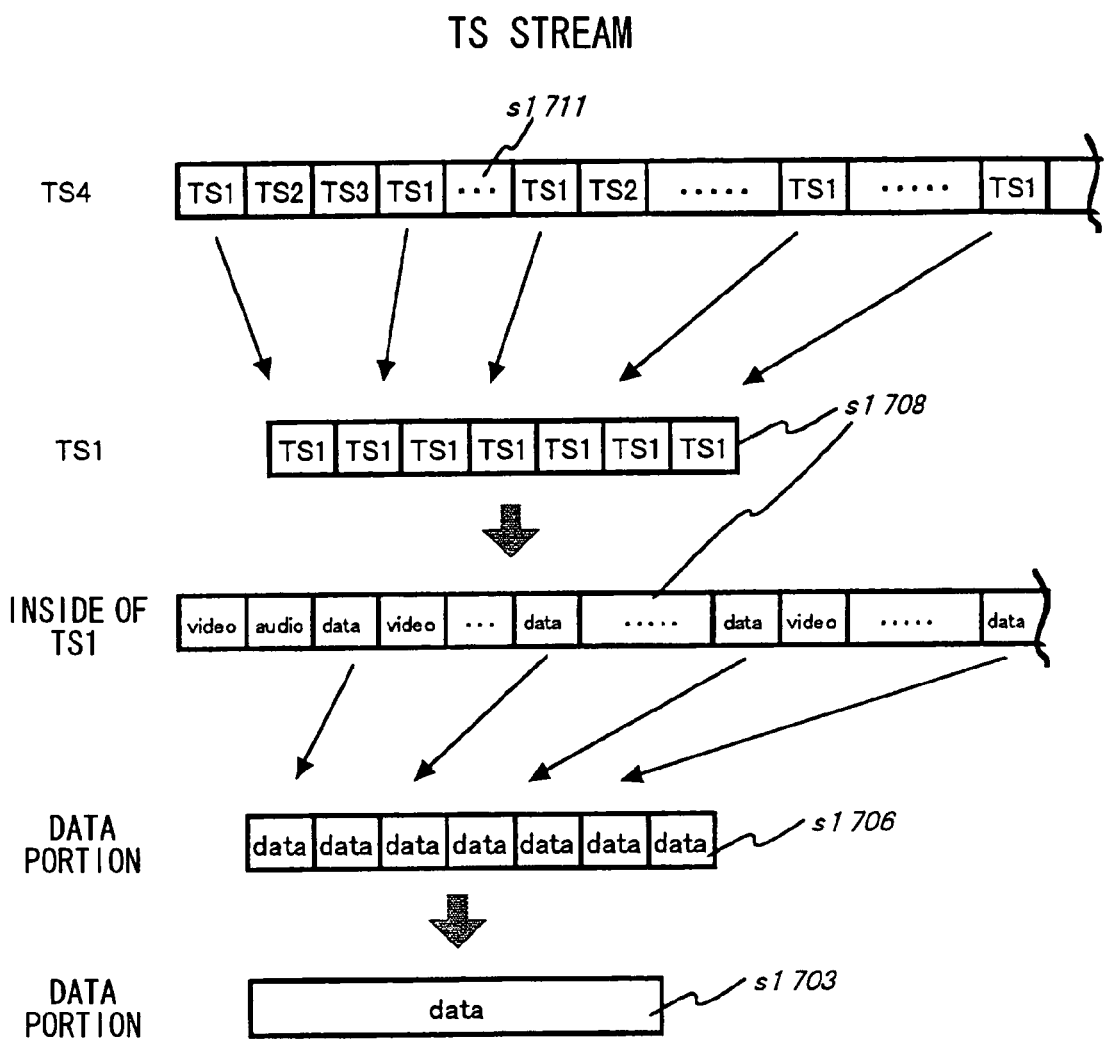
FIG. 7 is a diagram schematically showing a processing for reproducing additional data of a predetermined channel from a multiplexed TS signal.

FIG. 7 schematically shows a process for reproducing (extracting) the additional data s1703 in the TS signal s1708 (TS1) from the TS signal s1711 (TS4). First, only the TS1 is separated from the multiplexed TS4. Since the three portions, i.e., the video portion, the audio portion and the data portion are contained in the TS1, only the data portion is collected from them and the header portion is deleted to generate the original data (additional data). For the separation and collection, header identifiers of the PID, PMT, table_ID and tag_value are used.

Figure 8:
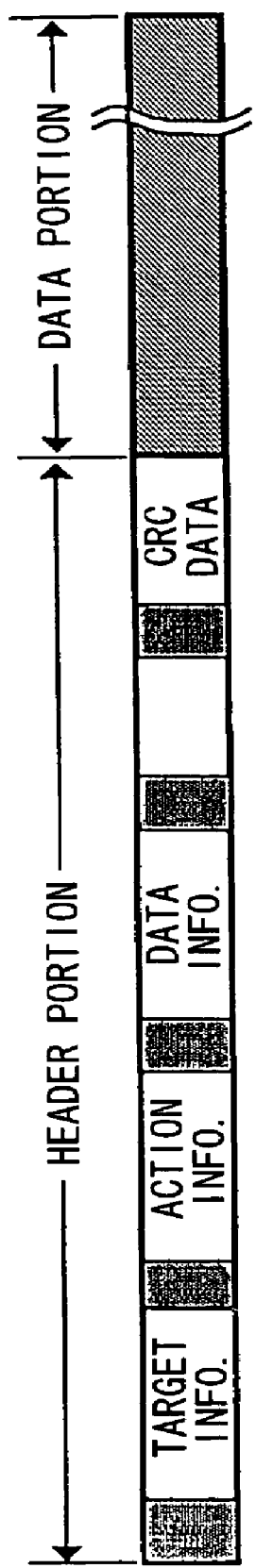
FIG. 8 is a diagram showing a data structure of additional data.

FIG. 8 shows a data structure of additional data. The additional data is divided into a header portion and a data portion.

The TV system controller 150 analyzes contents of the header portion, and conducts processing on the data portion.

An example of a structure of the header portion is shown in FIG. 8. The header portion contains target information, action information, data information and CRC data.

The target information contains information for identifying an electronic device (target device) which becomes the subject of an action described later. The target information may be any information so long as it is information identifying a target device. For example, the target information may be information that can be compared with the above-described information (such as the maker name, device name, manufacture number, manufacture date and software version) inherent to the device stored in the configuration ROM.

As shown in FIG. 9, the action information is a portion for defining processing (action) to be conducted on the target device. For example, there are actions such as data rewriting, and advertisement, display and printing using CM data.

As shown in FIG. 10, the data information contains application information representing a kind of data stored in the data portion, such as whether the data is program data or print data.

FIRST OPERATION EXAMPLE

Figure 11A:
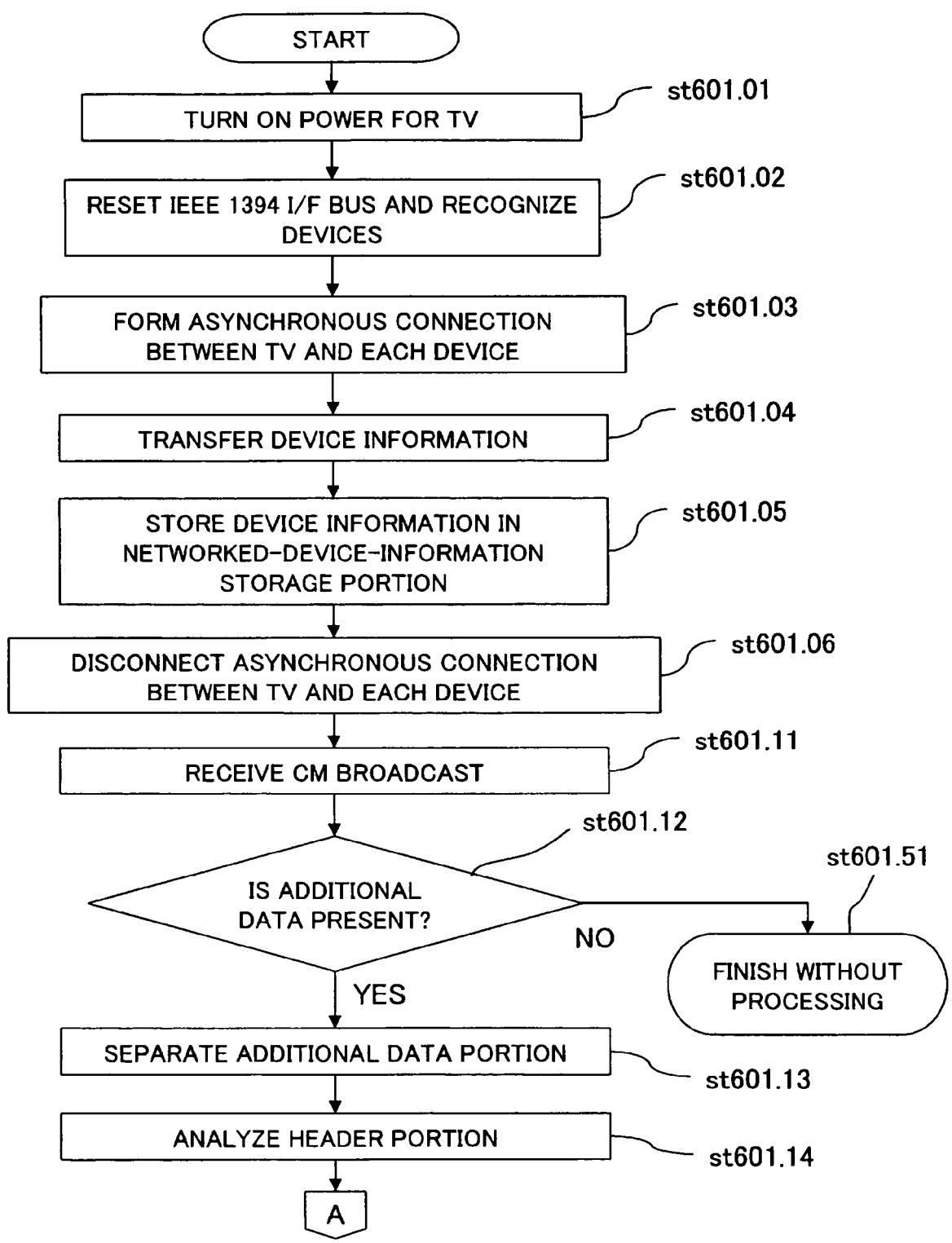
FIGS. 11A and 11B are flow charts showing a first processing operation example.
Figure 11B:
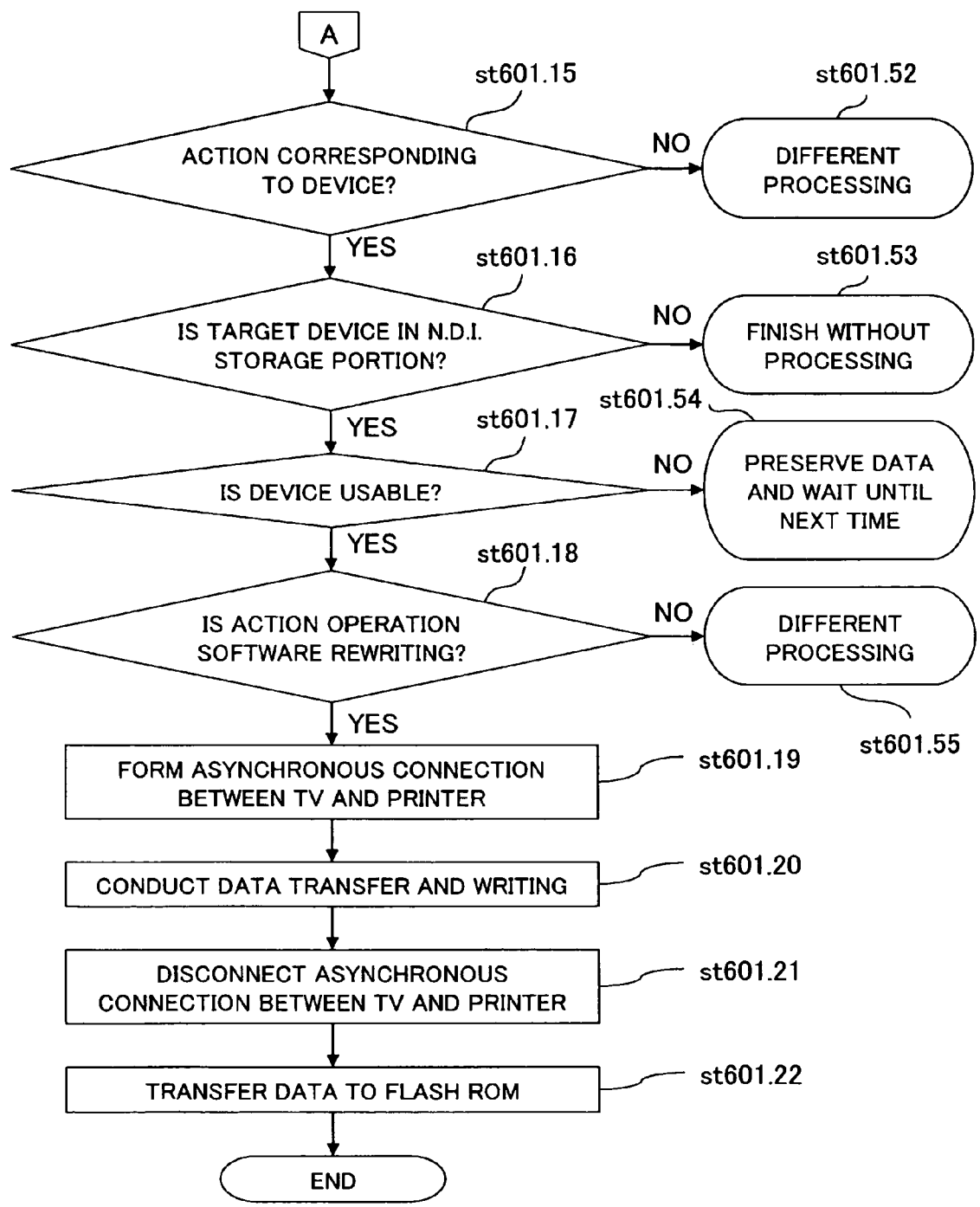

A processing operation example in the network system shown in FIG. 1 will now be described with reference to flow charts shown in FIGS. 11A and 11B. It is supposed in the present example that the TV apparatus 1 (product manufactured by company A), VTR 2 (product manufactured by company B), and the printer 3 (which is a product manufactured by company C, and which has a device name c777, manufacture date March 1998, a software version c100, and control software stored in the flash ROM 305) are connected to the network 11.

The broadcast signal in the present example becomes the TS4 (the TS signal s1711) obtained by multiplexing three TS signals, i.e., TS1 (TS signal s1708), TS2 (TS signal s1709) and TS3 (TS signal s1710) as described with reference to FIG. 6. It is now supposed that CM broadcast of the company C is contained in the TS1 among them, and the additional data is present in the CM broadcast.

Specifically, it is supposed that with respect to the printer manufactured by the company C having the device name c777, manufacture date January to June 1998, and software version c100, additional data for rewriting control software of the version c100 to become version up data c101 is contained in the CM broadcast data of the company C. FIG. 12 shows a data structure of the additional data. As shown in FIG. 12, values indicating contents of the additional data are stored in respective kinds of information in the header portion, and rewriting software data (version up data c101) is stored in the data portion.

It is now supposed that power supplies of the VTR 2 and the printer 3 are already on and the VTR 2 and the printer 3 can be used. It is supposed that they were connected to the TV apparatus land used, and recognized by the TV apparatus 1 formerly.

It is supposed that power supplies of the TV apparatus 1 and the DVD player 4 are off. However, it is supposed that the DVD player 4 was connected to the TV apparatus 1 and used (turned on), and recognized by the TV apparatus 1 formerly.

Turning on a power switch of the TV apparatus 1 (st601.01) causes bus reset generation, initialization of the IEEE 1394 I/F, reconstruction of connection information, and re-recognition of networked devices. Therefore, the VTR 2 and the printer 3, which are on in power supply and usable, are recognized by the 1394 I/F 120 and recognized by the TV system controller 150 (st601.02).

Subsequently, the TV system controller 150 controls the 1394 plug buffer 122 and the 1394 I/F 120 to form asynchronous connection between the VTR 2 and the printer 3 connected to the network 11 so as to make the TV apparatus 1 a consumer and make the VTR 2 and the printer 3 producers (st601.03).

And the TV system controller 150 issues a transfer request of inherent device information to each device (st601.04). Upon receiving the information, the TV system controller 150 stores the information in the networked-device-information storage portion 124 (st601.05). Furthermore, the TV system controller 150 stores inherent device information of the TV apparatus 1 itself in the networked-device-information storage portion 124 through the inner bus 1101.

If at this time the newly received inherent device information has the same value as the inherent device information received earlier at the time of bus reset, the TV system controller 150 leaves the former value as it is. If there is a different portion, the TV system controller 150 rewrites the portion. If at the time of bus reset, the formerly received device is not recognized, the TV system controller 150 defines only usable information in the inherent information of the device as unusable, and leaves other portions as they are. In the present example, the device information of the VTR 2 and the printer 3 is left as its is, and usable information included in the device information concerning the DVD player 4 is defined as unusable.

Whereas the above-described processing operation (st601.02) is conducted, after the power supply is turned on, the TV apparatus 1 receives the broadcast signal (electric wave) sent out as described with reference to FIG. 6, via the antenna 101. The received broadcast signal is tuned, amplified and demodulated in the tuner 102, and thereby a multiplexed TS signal (TS4) as shown in FIG. 7 is obtained (st601.11).

It is now supposed that a CM (commercial message) of the company C has started in the broadcast of the TS signal (TS1). In this case, the demultiplexer 103 first separates the TS1, and then separates the TS1 into the video portion, the audio portion and the data portion (the additional data) as described with reference to FIG. 7 (st601.12 and st601.13). If additional data is not present, the processing operation is finished with the processing uncompleted (st601.12 and st601.51)

Thereafter, data in the video portion and data in the audio portion are sent to the TS decoder 105 through the switch 104, and decoded.

On the other hand, the separated additional data is sent to the data buffer 106. When the additional data is input to the data buffer 106, the TV system controller 150 decodes the additional data, and analyzes the header portion (st601.14). The TV system controller 150 determines on the basis of matching of data in the header portion whether the additional data is the corresponding action of a networked device (st601.15). Unless the additional data is the corresponding action of a networked device, for example, the additional data is EPG data or CA data, or if the additional data cannot be analyzed, then the processing proceeds to different processing corresponding thereto (st601.52).

If the additional data is the corresponding action of a networked device, the TV system controller 150 further analyzes the inside of the header portion. The TV system controller 150 finds that the subject of additional data is a product of the company C having a device name c777, a manufacture number c123 and a software version c100, and searches the networked-device-information storage portion 124 for inherent device information coinciding with the information (st601.16). Unless inherent device information coinciding with the information is present, then the processing is regarded as unprocessed and the additional data is discarded and the processing is finished (st601.53).

If coinciding inherent device information is present in the networked-device-information storage portion 124, it is determined by referring to the usable information whether the device is usable or not (st601.17). If the device cannot be used, then the additional data is preserved in the additional data storage portion 128, and the information is displayed on the display unit 131. For example, a message "Information concerning your printer c777 produced by company C has been received. Turn on power for the printer." is displayed.

By the way, as for the preserved additional data, its contents are executed when the device has become usable (st601.54). Furthermore, the preserved additional data is managed by the TV system controller 150. If the preserved additional data is not executed even if a certain fixed time has elapsed, it is discarded (erased).

In the present example, the printer 3 (which is the product produced by the company C having the device name c777, manufacture date March 1998, and the software version c100) is present and its power is in the on-state, and consequently the printer 3 can be used. Therefore, the processing proceeds, and it is determined on the basis of the action information in the header portion in the additional data whether the action operation is software rewriting (st601.18). Otherwise, different processing according to the action information in the header portion is conducted (st601.55).

Since it is determined that the additional data relates to the software data rewriting processing, the TV system controller 150 forms an asynchronous connection so as to make the TV apparatus 1 a producer and make the printer 3 a consumer (st601.19).

And the TV system controller 150 writes data given by the data portion in the additional data into a segment buffer in the 1394 plug buffer 302 in the printer 3 through the network 11 (st601.20).

If data transfer is finished, then the TV system controller 150 disconnects the asynchronous connection formed between the TV apparatus 1 and the printer 3, and finishes the processing (st601.21).

On the other hand, the print controller 306 in the printer 3 analyzes data received in the segment buffer in the 1394 plug buffer 302, determines that the data is version up data for its own print control software, and transfers the data to a program portion in the flash ROM 305 (st601.22).

As heretofore described, according to the present operation example, the control software of the printer 3 connected to the home network 11 is automatically subject to version up by using the additional data contained in the broadcast signal.

SECOND OPERATION EXAMPLE

Figure 13A:
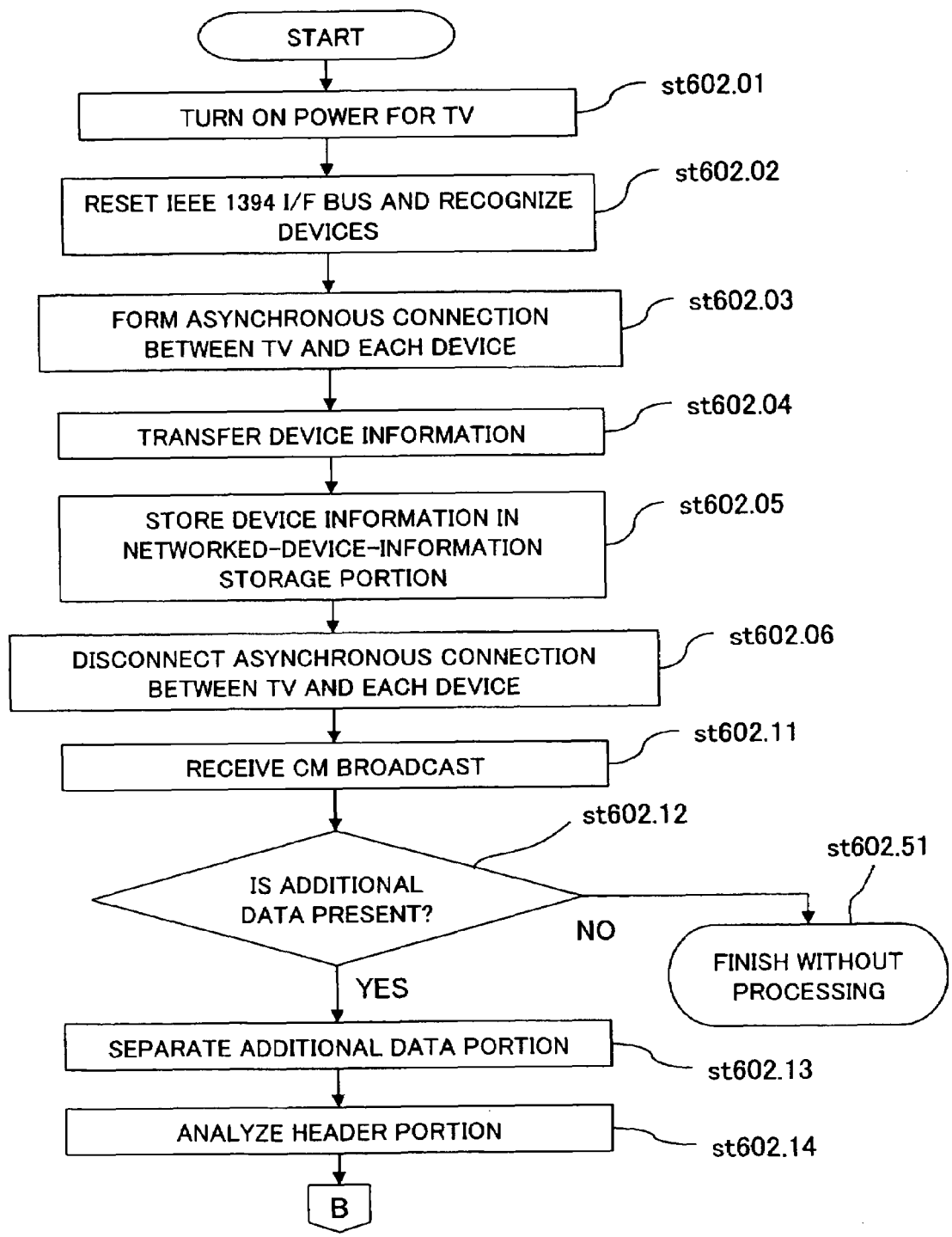
FIGS. 13A and 13B are flow charts showing a second processing operation example.
Figure 13B:
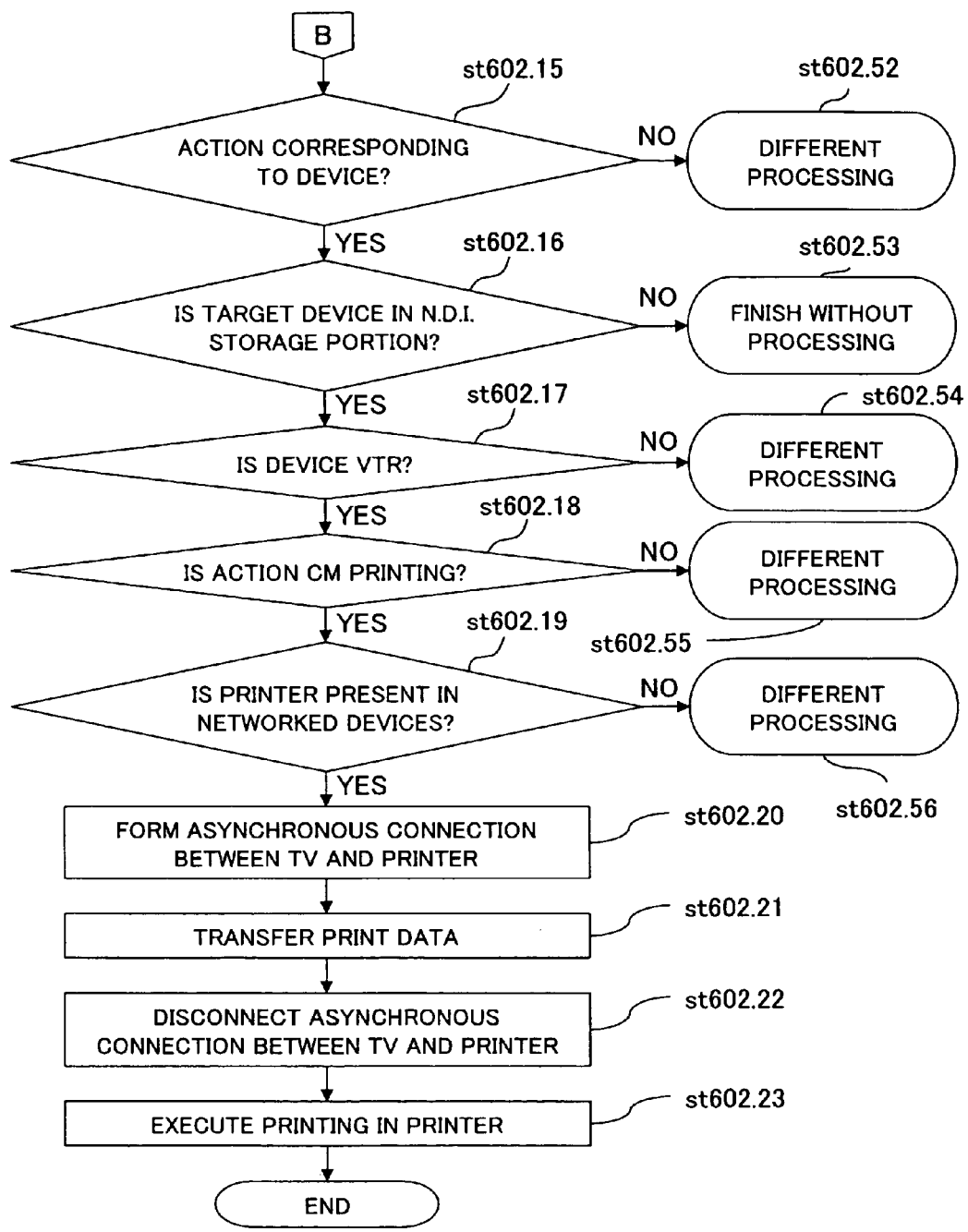

A processing operation example in the network system shown in FIG. 1 will now be described with reference to flow charts shown in FIGS. 13A and 13B. It is supposed in the present example that the TV apparatus 1 (product manufactured by company A), VTR 2 (which is a product manufactured by company B, and which has a category VHS Video, a device name b123 and manufacture date July 1992), and the printer 3 (product manufactured by company C) are connected to the network 11.

As for the broadcast signal in the present example, it is supposed that CM broadcast is contained in the TS1 (the TS signal s1708), and the additional data is present in the CM broadcast in the same way as the above-described first operation example.

Specifically, it is supposed that with respect to products having a category VHS Video, and manufacture date earlier than January 1993 or products similar to a product s123 produced by a company S, advertisement data for a campaign for new products produced by the company S are contained in the CM broadcast data of the company S and are set to be printed out if there is any networked printer. FIG. 14 shows a data structure of the additional data. As shown in FIG. 14, values indicating contents of the additional data are stored in the header portion, and print data is stored in the data portion.

Turning on the power switch of the TV apparatus 1 (st602.01) causes bus reset generation, initialization of the IEEE 1394 I/F, and reconstruction of connection information in the same way as the above-described first operation example. And the TV system controller 150 recognizes electronic devices connected to the network 11 (st602.02).

Subsequently, the TV system controller 150 controls the 1394 plug buffer 122 and the 1394 I/F 120 to form asynchronous connection between the VTR 2 and the printer 3 connected to the network 11 so as to make the TV apparatus 1 a consumer and make the VTR 2 and the printer 3 producers (st602.03).

And the TV system controller 150 issues a transfer request of inherent device information to each device (st602.04). Upon receiving the information, the TV system controller 150 stores the information in the networked-device-information storage portion 124 (st602.05). As for the VTR 2, information that it is a product manufactured by company B, and it has a category VHS Video, a device name b123 and manufacture date July 1992 is stored. Furthermore, the inherent device information of the TV apparatus 1 itself is stored in the networked-device-information storage portion 124 through the inner bus 1101.

Whereas the above-described processing operation (st602.02) is conducted, after the power supply is turned on, the TV apparatus 1 receives the broadcast signal sent out as described with reference to FIG. 6, via the antenna 101. The received broadcast signal is tuned, amplified and demodulated in the tuner 102, and thereby a multiplexed TS signal (TS4) as shown in FIG. 7 is obtained (st602.11).

It is now supposed that a CM (commercial message) of the company S has started in the broadcast of the TS signal (TS1). In this case, the demultiplexer 103 first separates the TS1, and then separates the TS1 into the video portion, the audio portion and the data portion (the additional data) as described with reference to FIG. 7 (st602.12 and st602.13). If additional data is not present, the processing operation is finished with the processing uncompleted (st602.12 and st602.51).

Thereafter, data in the video portion and data in the audio portion are sent to the TS decoder 105 through the switch 104, and decoded.

On the other hand, the separated additional data is sent to the data buffer 106. When the additional data is input to the data buffer 106, the TV system controller 150 decodes the additional data, and analyzes the header portion (st602.14). The TV system controller 150 determines on the basis of matching of data in the header portion whether the additional data is the corresponding action of a networked device (st602.15). Unless the additional data is the corresponding action of a networked device, for example, the additional data is EPG data or CA data, or if the additional data cannot be analyzed, then the processing proceeds to different processing corresponding thereto (st602.52).

If the additional data is the corresponding action of a networked device, the TV system controller 150 further analyzes the inside of the header portion, finds that the subject of additional data is a product having a category of VHS video and manufacture date earlier than January 1993, and searches the networked-device-information storage portion 124 for inherent device information coinciding with the information (st602.16). Unless inherent device information coinciding with the information is present, then the processing is regarded as unprocessed and the additional data is discarded and the processing is finished (st602.53).

In the present example, the VTR 2 becomes the subject (i.e., coinciding inherent device information is present in the networked-device-information storage portion 124) (st602.17), and consequently the processing proceeds, and it is determined on the basis of the action information in the header portion in the additional data whether the action operation is data printing (st602.18). Otherwise, different processing according to the action information in the header portion is conducted (st602.55).

Since it is determined that the additional data relates to the printing processing, the TV system controller 150 search the network for a printer (st602.19). In the case of the present example, the printer 3 is present on the network. Therefore, the TV system controller 150 forms asynchronous connection so as to make the TV apparatus 1 a producer and make the printer 3 a consumer in order to make the printer 3 execute printing (st602.20).

And the TV system controller 150 transfers data stored in the data buffer 106 to the printer 3 through the IEEE 1394 network by using the print controller 125. This data is written into a segment buffer in the 1394 asynchronous plug buffer 302 in the printer 3 (st602.21).

If the data transfer is finished, the TV system controller 150 disconnects the asynchronous connection formed between the TV apparatus 1 and the printer 3, and finishes the processing (st602.22).

On the other hand, the print controller 306 in the printer 3 analyzes the data received and stored in the segment buffer in the 1394 asynchronous plug buffer 302, determines that the data is print data for its own printer, transfers the data to the print unit 307, and executes printing (st602.23).

As heretofore described, according to the present operation example, on the basis of a result of collation of the additional data with the inherent device information of the VTR 2, it is possible to make the printer 3, which is a different device from the VTR 2, execute print processing.

In the above described embodiment, IEEE 1394 is used as a network for connecting the devices. However, it is also possible to use the 12C bus, the Ethernet (R), the USB, or the like and provide means for recognizing the networked devices. The network may be wired or wireless. The transmission medium is not limited to an electric signal, but maybe an optical fiber cable, infrared light, or electric wave. Furthermore, instead of using a transmission medium of one kind, a plurality of networks may be linked.

In other words, the network may be any network so long as it can connect a plurality of electronic devices having separate chassis to each other.

Furthermore, in the present embodiment, turning on the power switch of the TV apparatus causes bus reset in the IEEE 1394 I/F and recognition of the networked devices. However, this maybe replaced by anything such as power on/off in another device or insertion or removal of a connector, so long as it can cause bus reset in the IEEE 1394 I/F.

Furthermore, in the present embodiment, a network system having the TV apparatus 1, the VTR 2, the printer 3 and the DVD player 4 connected thereto has been described. However, the present invention can be applied to a network system having other electronic devices. For example, the present invention can be applied to, AV devices such as a TV tuner, an FM tuner, an audio cassette recorder and an amplifier, OA devices such as a personal computer, a scanner, a FAX, a telephone, a modem, a display monitor, a printer or a copier, domestic electrification devices such as a refrigerator, a washing machine or an iron, a door phone, and a domestic network system such as a bathroom management system or crime prevention system.

Furthermore, the TV apparatus 1 in the present embodiment has a large number of functions such as a tuner, a demultiplexer and a TV system controller. These functions may be present in a device, such as a printer, connected by the IEEE 1394 I/F and may be subject to general control.

Furthermore, in the present embodiment, data rewriting (software version up) processing and print processing have been described as an example of "predetermined processing" executed in electronic devices. As described above, however, the present invention can be applied to various electronic devices. According to the kind and function of the subject electronic device, therefore, various kinds of processing can be executed. For example, as "predetermined processing," display processing (display for urging version up, display for notifying version up work, or display for indicating that the connected electronic device is a subject of advertisement) for a TV apparatus and a personal computer, or audio output processing for an AV device can also be executed. Furthermore, in the present embodiment, since the TV apparatus 1 is also one of the electronic devices, the TV apparatus 1 may make the TV apparatus 1 itself execute predetermined processing on the basis of the additional data.

In the present embodiment, a processing circuit for controlling an electronic device on the basis of the additional data is provided in the chassis of the TV apparatus 1. However, the means for receiving a broadcast signal and the above-described processing circuit need not be provided in the same chassis, but the processing circuit may be provided in a different chassis, i.e., within an independent apparatus or an electronic device other than the TV apparatus 1.

Other Embodiments

In order to make various devices operate in order to implement the functions of the above-described embodiments, a program code of software for implementing the functions of the above-described embodiments is supplied to a computer in an apparatus connected to various devices or in a system, the devices are operated in accordance with a program stored in a computer (CPU or MPU) in the system or the apparatus. Such a configuration is also included in the scope of the present invention.

Furthermore, in this case, the program code itself of the software implements the function of the above-described embodiment. The program code itself forms the present invention. As the transmission medium for the program code, a communication medium (a wired line such as optical fiber or a radio line) in a computer network (a LAN, a WAN such as the Internet, or a radio communication network) for propagating program information as a carrier wave can be used.

In addition, means for supplying the program code to the computer, such as a recording medium for storing such a program code forms the present invention. As the recording medium for storing such a program code, for example, a flexible disk, a hard disk, an optical disk, an optical magnetic disk, a CD-ROM, magnetic tape, a nonvolatile memory card, a ROM or the like can be used.

Furthermore, not only in the case where the functions of the above-described embodiments are implemented by execution of the program code in the computer, but also in the case where the functions of the above-described embodiments are implemented by the program code operating in conjunction with an OS (operating system) running on the computer or other application software, it is a matter of course that such a program code is incorporated in the embodiments of the present invention.

The supplied program code is stored in a memory included in a function expansion board of a computer or in a function expansion unit connected to a computer. Thereafter, a CPU included in the function expansion board or the function expansion unit conducts a part or the whole of actual processing on the basis of an order given by the program code. The functions of the above-described embodiments are implemented by the processing. It is a matter of course that such a case is also incorporated in the present invention.

Any of shapes and structures of components shown in the above described embodiments is nothing but an example of implementation. The scope of the present invention should not be construed limitedly by them. In other words, the present invention can be embodied in various forms without departing from the spirit or its major features.

What is claimed is:

1. A network system comprising:
a TV apparatus and an electronic device connected to the TV apparatus via a network, the TV apparatus being capable of receiving a broadcast signal, wherein the broadcast signal contains identification data identifying one of electronic devices connectable to the network, which is not capable of receiving the broadcast signal, and control data for controlling a version-update of a control software to be executed on the electronic device identified by the identification data,
wherein the TV apparatus comprises:
a storage unit that stores the identification data and the control data contained in the received broadcast signal;
a control unit that collates the identification data of the electronic device with inherent information of the electronic device, inquires whether the identified electronic device is in an on-state, and in a case where the identified electronic device is in an on-state, transmits the control data stored in the storage unit to the identified electronic device via the network so as to execute a version-update of control software stored in a memory unit in the identified electronic; and
wherein the identification data contains a name of a manufacturer for the electronic device to be controlled, and the identification data and the control data are contained in a signal of a commercial message (CM) broadcast of the manufacturer.

2. A TV apparatus which can be connected to a network and is connected to an electronic device via the network, the TV apparatus comprising:
a receiver that receives a broadcast signal, the broadcast signal containing identification data identifying one of the electronic devices on the network, which is not capable of receiving the broadcast signal, and control data for controlling a version-update of a control software to be executed on the electronic device identified by the identification data;
a storage unit that stores the identification data and the control data contained in the received broadcast signal;
a control unit that collates the identification data of the electronic device with inherent information of the electronic device, inquires whether the identified electronic device is in an on-state, and in a case where the identified electronic device is in an on-state, transmits the control data stored in the storage unit to the identified electronic device via the network so as execute a version-update of control software stored in a memory unit in the identified electronic; and
wherein the identification data contains a name of a manufacturer for the electronic device to be controlled, and the identification data and the control data are contained in a signal of a commercial message (CM) broadcast of the manufacturer.

3. A method of controlling a software update for an electronic device connected to a TV apparatus on a network utilizing a broadcast signal, wherein the electronic device is not capable of receiving the broadcast signal, comprising the steps of:
transmitting a broadcast signal, wherein the broadcast signal includes identification data identifying one of electronic devices connectable to the network, which is not capable of receiving the broadcast signal, and control data for controlling a version-update of a control software to be executed on the electronic device identified by the identification data;
receiving the broadcast signal by the TV apparatus connected to the network;
storing in a storage unit of the TV apparatus, the identification data and the control data contained in the broadcast signal received by the TV apparatus;
collating, by the TV apparatus, the identification data of the electronic device with inherent information of the electronic device, inquiring whether the identified electronic device is in an on-state, and in a case where the identified electronic device is in an on-state, transmitting, by the TV apparatus to the electronic device via the network, the control data stored in the storage unit so as to execute a version-update of control software stored in a memory unit in the identified electronic device; and
wherein the identification data contains a name of a manufacturer for the electronic device to be controlled, and the identification data and the control data are contained in a signal of a commercial message (CM) broadcast of the manufacturer.

4. A network system according to claim 1, wherein in a case where the identified electronic device is not in an on-state, the control unit controls a display unit of the TV apparatus to display a message urging a user to set the identified electronic device to an on-state.

* * * * *